United States Patent Office 2,895,862
Patented July 21, 1959

2,895,862
SOLDER FLUXES

Harry B. Laudenslager, Jr., Jamestown, N.Y., assignor to Blackstone Corporation, Jamestown, N.Y., a corporation of New York No Drawing. Application September 18, 1956
Serial No. 610,673

7 Claims. (Cl. 148—23)

This invention relates to solder fluxes and particularly to a solder flux for soft solders and the like. There are a great many soldering applications which require a solder flux having the ability to flow into restricted areas (commonly called "capillarity") and to cause solder to flow into the same restricted areas with good setting and bonding properties. Such an application is the forming of tubing for automotive radiator cores. A soldering flux to be satisfactory for such applications must be readily washed away after soldering has been completed. It must inhibit oxide formation while in place on the material being soldered. It must be non-toxic, produce a minimum of corrosive products and have good fluxing properties over a wide range of temperatures. Heretofore, acid chloride fluxes have been generally used in such applications. These usual chloride fluxes require large amounts of cleaning equipment, steam, hot water and time in order to assure complete removal of the fluxes after soldering has been completed. Great difficulty has been experienced in the past by the residue from such fluxes corroding the metal surfaces and attacking and destroying paint coatings applied thereto after the usual cleaning operation. As a result, the chloride fluxes heretofore used have been expensive to handle and remove after the soldering operation was complete and, even after painstaking cleaning operations there was no assurance that the fluxes had been entirely removed.

I have discovered a soldering flux composition which eliminates all of the difficulties characteristic of the chloride fluxes heretofore used. I have discovered a flux composition which is readily soluble in water and can be immediately painted over without the need for expensive steaming and cleaning operations. The residue from my flux composition, remaining after the soldering operation, is readily soluble, has very little corrosive action, is non-toxic, easy to handle and non-hygroscopic. In addition, the flux of my invention has very high capillarity and causes the solder to flow into a joint being soldered much more rapidly and smoothly than is the case with the ordinary chloride fluxes of which zinc chloride flux is representative.

I have discovered a soldering flux composed of a water soluble, organic acid having less than 8 to 10 carbon atoms in the chain with the hydroxy group preferably on the alpha or beta atom, mixed in amounts between about 3% to 12%, from about 1% to 6% ammonium chloride, 0.5% to 1% stannous chloride and 0.1% to 0.5% of a wetting agent all in water solution. Preferably, the flux of my invention will have the following composition: about 12% hydroxyacetic acid (HOCH$_2$COOH), about 4% ammonium chloride (NH$_4$Cl), about 1% stannous chloride (SnCl$_2$), and about 0.5% of a wetting agent, either anionic or non-ionic, and the balance water. I have found that the wetting agents sold under the names Tergitol EH and Tergitol #4 are very satisfactory for use in my flux. These materials are manufactured by Carbide and Carbon Chemicals Co. and are higher sodium alkyl sulfates. The material known as Compound M sold by Johnson Marsh Company of Philadelphia and composed of polyether alcohols of varying chain lengths has also proven satisfactory as the wetting agent.

I have found that ammonium nitrate and urea, along with ammonium halides may be used in place of ammonium chloride, either in part or in its entirety. I have found that the presence of stannous chloride is necessary in order to obtain the high capillarity and speed. Zinc chloride may be added in small amounts where high temperatures over long periods of time are likely to be encountered, without detrimentally affecting the flux.

Tests have shown that the flux of the present invention has a much better capillary action than conventional chloride fluxes. Side by side comparisons were made in the following manner: Radiator core tubes were immersed on end to a depth of one inch of molten solder of the composition 85% lead and 15% tin at a temperature of 700° F. for a total immersion time of ten seconds, after having been treated with the flux of the present invention and a normal zinc chloride flux. The samples were withdrawn and the height of the solder measured. The difference between the height of the solder and the depth of dip was recorded as the capillary flow of the solder:

Table I

| Flux | Height | Depth | Capillary |
|---|---|---|---|
| Preferred Flux of this Invention | 1.249 | 1.000 | .249 |
| Zinc Chloride | 1.223 | 1.000 | .223 |

The foregoing table shows that the preferred flux of the present invention gives 11.65% better capillary action than standard zinc chloride fluxes. In addition, the time required for cleaning and removing the excess flux of my invention is only a fraction of the time required for removing conventional chloride flux composition.

Tests have been conducted with the flux of the present invention to which zinc chloride has been added. Comparison has shown that in the case of brass and other zinc bearing materials, there is a diminished rate of dezincification in the case where the flux of the present invention was used in combination with zinc chloride, as compared with the situation where the same amount of zinc chloride alone was used. It is thus clear that even in those additions where zinc chloride must be added to take care of high temperature situations a substantial advantage is obtained by the use of the present flux. Again, in addition to the decreased rate of dezincification, the residue remaining after the soldering operation is much more readily removed where the flux of the present invention is used, as compared with zinc chloride alone.

While I have set out certain preferred forms of my invention in the foregoing description, it will be understood that this invention may be otherwise embodied within the scope of the following claims.

I claim:

1. A soldering flux consisting essentially of about 3% to 12% of a water soluble, organic acid having less than 8 to 10 carbon atoms in the chain, about 1% to 6% of a material selected from the group consisting of ammonium halides, ammonium nitrate and urea, 0.5% to 1% stannous chloride and about 0.1% to 0.5% of a wetting agent selected from the group consisting of anionic and non-ionic wetting agents and the balance water.

2. A soldering flux consisting essentially of about

3% to 12% of a water soluble, organic acid having less than 8 to 10 carbon atoms in the chain, said organic acid having the hydroxy group on one of the alpha and beta atoms of the carbon chain, about 1% to 6% ammonium chloride, about 0.5% to 1% stannous chloride and 0.1% to 0.5% of a wetting agent selected from the group consisting of anionic and non-ionic wetting agents and the balance water.

3. A soldering flux consisting essentially of about 3% to 12% hydroxy-acetic acid, about 1% to 6% ammonium chloride, 0.5% to 1% stannous chloride, 0.1% to 0.5% of a wetting agent selected from the group consisting of anionic and non-ionic wetting agents and the balance water.

4. A soldering flux consisting essentially of about 3% to 12% hydroxy-acetic acid, about 1% to 6% ammonium nitrate, 0.5% to 1% stannous chloride, 0.1% to 0.5% of a wetting agent selected from the group consisting of anionic and non-ionic wetting agents and the balance water.

5. A soldering flux consisting essentially of about 3% to 12% hydroxy-acetic acid, about 1% to 6% urea, 0.5% to 1% stannous chloride, 0.1% to 0.5% of a wetting agent selected from the group consisting of anionic and non-ionic wetting agents and the balance water.

6. A soldering flux consisting essentially of about 3% to 12% hydroxy-acetic acid, about 1% to 6% of an ammonium halide, 0.5% to 1% stannous chloride, 0.1% to 0.5% of a wetting agent selected from the group consisting of anionic and non-ionic wetting agents and the balance water.

7. A soldering flux consisting essentially of about 3% to 12% of a water soluble, organic acid having less than 8 to 10 carbon atoms in the chain, said organic acid having the hydroxy group on one of the first two atoms of the carbon chain, about 1% to 6% ammonium chloride, about 0.5% to 1% stannous chloride and 0.1% to 0.5% of a wetting agent selected from the group consisting of anionic and non-ionic wetting agents and the balance water.

References Cited in the file of this patent

UNITED STATES PATENTS

| | | |
|---|---|---|
| 2,160,195 | Beno | May 30, 1939 |
| 2,440,592 | MacDougall et al. | Apr. 27, 1948 |
| 2,631,952 | Williams | Mar. 17, 1953 |